Sept. 29, 1925.
A. E. ROCKEY
1,555,434
DISPENSING DEVICE
Filed July 21, 1924
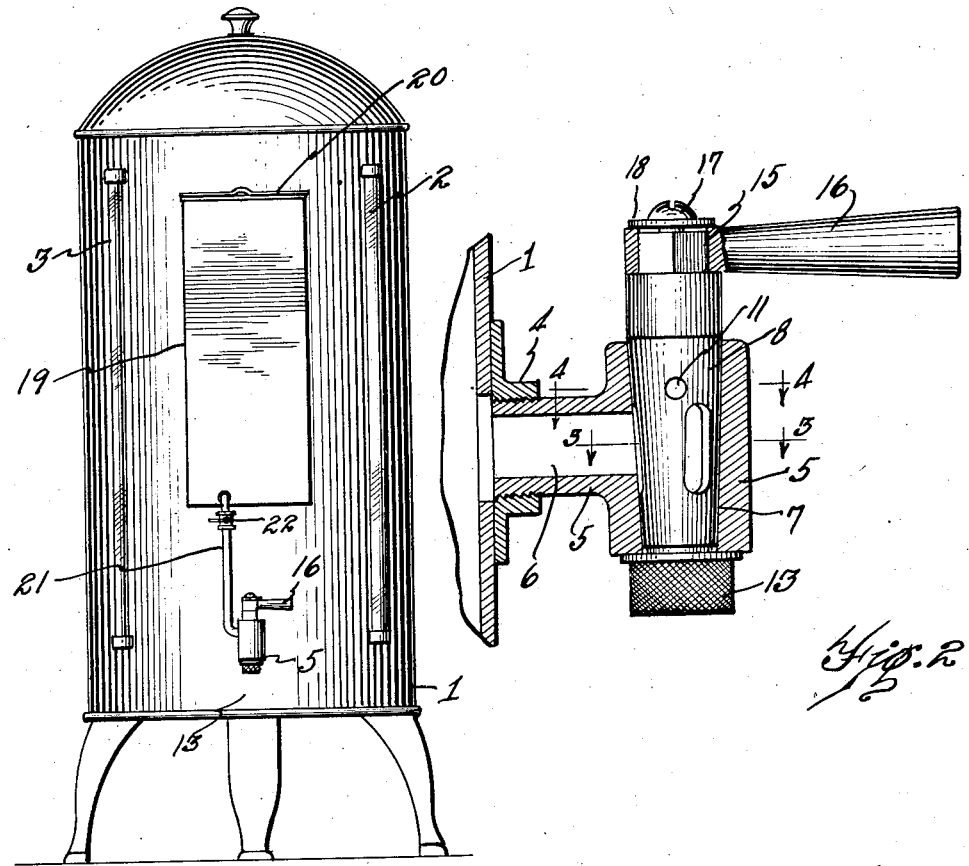
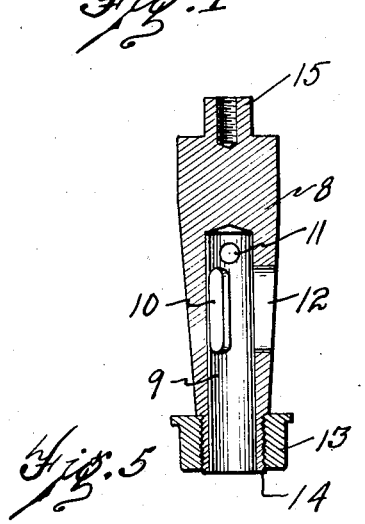
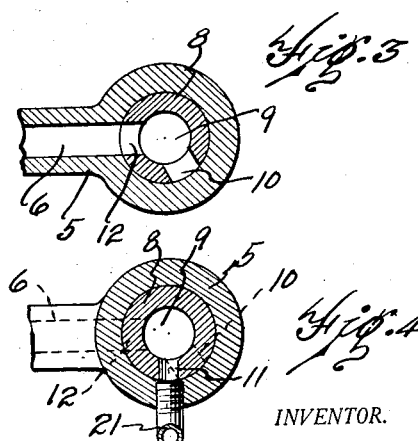
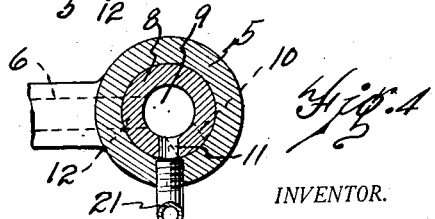
INVENTOR.
Albert E. Rockey
BY
ATTORNEY.

Patented Sept. 29, 1925.

1,555,434

UNITED STATES PATENT OFFICE.

ALBERT E. ROCKEY, OF DETROIT, MICHIGAN.

DISPENSING DEVICE.

Application filed July 21, 1924. Serial No. 727,223.

*To all whom it may concern:*

Be it known that I, ALBERT E. ROCKEY, a citizen of the United States, and residing at Detroit, in the county of Wayne and State of Michigan, have invented a new and Improved Dispensing Device, of which the following is a specification.

This invention relates to dispensing devices, and the object of the invention is to provide a dispensing device for use with coffee urns whereby a fixed amount of cream is added to the coffee as it flows from the coffee urn.

Another object of the invention is to provide a dispensing device whereby either coffee or coffee with cream may be dispensed at the will of the operator.

One of the principal objects of the invention is to provide a dispensing device in which the coffee and cream may be dispensed into a cup in one operation instead of the two operations heretofore required in putting the coffee in the cup and then adding the cream, thus effecting a considerable saving of time especially where quick lunches are served.

This device also effects a saving in the amount of cream used and eliminates the waste of cream which occurs when the cream is put in the cup separately from the coffee as it is impossible to dispense a fixed amount of cream in each cup of coffee manually.

Another object of the invention is to provide a device of the character described which may be easily connected to the coffee urn without any change in the structure of the urn.

These objects and the several novel features of the invention are hereinafter more fully described and claimed, and the preferred form of construction by which these objects are attained is shown in the accompanying drawings in which—

Fig. 1 is a front elevation of a coffee urn showing my dispensing device connected thereto.

Fig. 2 is an enlarged section through the dispensing valve.

Fig. 3 is a section taken on line 3—3 of Fig. 2.

Fig. 4 is a section taken on line 4—4 of Fig. 2.

Fig. 5 is a vertical section through the rotatable valve member.

A coffee urn 1 is shown in Fig. 1 having gauge glasses 2 and 3. This coffee urn, as shown in Fig. 2, is provided with a flange 4 into which a valve member 5 is threaded. This valve member 5 has an opening 6 to the interior of the coffee urn through which the coffee may flow and is provided with a tapered vertical opening 7 in which the rotatable valve member 8 is positioned. The rotatable valve member 8 is shown more particularly in Fig. 3 and comprises a tapered body having a recess 9 therein which opens through the bottom of the rotatable valve member. This rotatable valve member is provided with three apertures 10, 11 and 12 opening into the recess 9, the apertures 10 and 12 providing openings through which coffee may flow and the aperture 11 being a cream inlet as hereinafter described. This valve member 8 is positioned in the aperture 7 therefor in the valve member 5 and a knurled nut 13 is threaded onto the threaded end 14 of the rotatable valve member to properly seat the rotatable valve member in the stationary valve member. The rotatable valve member is provided with a squared upper end 15 onto which a handle 16 is fitted and is held in place by the screw 17 and washer 18 as will be readily understood from Figs. 2 and 5. The cream container 19 is mounted on the coffee urn as shown in Fig. 1 and is provided with a lid 20 and an outlet tube 21. This outlet tube 21 is threaded into the member 5 and registers with the opening 11 in the rotatable valve member as shown in Fig. 4. When the valve is turned so that the aperture 12 registers with the coffee outlet aperture 6, the aperture 11 is open to the cream outlet 21 so that the coffee and cream both flow out through the recess 9, the passage of the coffee through the outlet 9 tending to draw the cream therewith. If plain coffee is desired without the cream, the handle is turned until the aperture 10 registers with the aperture 6 and the aperture 11 is then turned away from the cream outlet so that the plain coffee passes through the apertures 6, 10 and 9. If desired, a valve 22 may be connected in the tube 21 and by setting the valve a fixed amount of cream may be dispensed with the coffee and the valve may be opened or closed to give a greater or less cream content to the coffee. In the ordinary restaurant the cream container is entirely separate from the coffee urn and an amount of cream is put in each cup of coffee but is usually not accurately measured and therefore considerable cream is wasted. With this device the cream content of a cup of coffee is exact resulting in a saving of cream over a method in which an approximate amount of cream is added to each cup of coffee. Another great saving with this device is the time saved in turning only one valve to dispense a cup of coffee in place of the two operations required in dispensing coffee and cream separately. This is of particular value in lunch rooms where quick service is the desired feature and allows more coffee to be dispensed in a given amount of time than is possible with the old method.

From the foregoing description it becomes evident that the device is very simple and efficient in operation; will not easily get out of order; is composed of few parts, and is of consequent low manufacturing cost and provides a device which accomplishes the objects described.

Having thus fully described my invention, its utility and mode of operation, what I claim and desire to secure by Letters Patent of the United States is—

1. A dispensing device comprising a coffee container, a cream container thereon and a dispensing valve common to both the said containers, an outlet pipe for each container connected with the valve body, the valve being rotatable on a vertical axis in the body and having a central recess opening through the lower end of the body, said valve having a pair of circumferentially spaced apertures opening through the wall of the valve body to the central recess adapted to be brought to registration with the coffee outlet, the valve also having a third aperture open to the recess adapted to be brought to registration with the cream outlet simultaneously with the turning of the valve to bring one of the other apertures to registration with the coffee outlet.

2. A dispensing device comprising the combination with a coffee container having a flanged aperture and a cream container, of a dispensing valve common to both containers comprising a valve body having an integral hollow extension on one side for threaded engagement with the flanged aperture, the said valve body having a tapered aperture therethrough at a right angle to the aperture of the extension and the said body having an aperture in the side thereof above the center line of the hollow extension, a conduit connected with said aperture of the body and with the cream container, a tapered valve fitting the tapered aperture, said valve having a central recess opening through the lower end of the valve and two apertures in the wall thereof adapted to be turned to registration independently with the hollow extension and also having an additional aperture opening to the interior recess brought to registration with the aperture for the cream conduit simultaneously with registration of one of the other of said apertures with the hollow extension, the said hollow extension being of a length to position the open end of the valve at a distance from the wall of the container to permit a cup or receptacle to be readily positioned therebeneath.

3. A dispensing device for use with a coffee container and a cream container, comprising a valve, a valve body common to both the said containers, an outlet pipe for each container connected with the valve body at different points, the outlet for the coffee container being of materially greater area in cross section than the outlet for the cream container, the valve being rotatable on a vertical axis in the body and having a central recess opening through the lower end of the body, the valve also having a pair of circumferentially spaced apertures adapted by the turning of the valve to be brought independently to registration with the coffee outlet and also having a third aperture opening to the recess and adapted to be brought to registration with the cream outlet simultaneously with the turning of the valve to bring one of the other apertures to registration with the coffee aperture.

In testimony whereof I sign this specification.

ALBERT E. ROCKEY.